(12) United States Patent
Dombrowski

(10) Patent No.: US 6,341,534 B1
(45) Date of Patent: Jan. 29, 2002

(54) INTEGRATED TWO-CHANNEL TORQUE SENSOR

(75) Inventor: John Edward Dombrowski, Ypsilanti Township, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/518,619

(22) Filed: Mar. 3, 2000

(51) Int. Cl.[7] .............................. G01B 7/24; G01C 3/10; G01R 33/18
(52) U.S. Cl. ................ 73/862.333; 324/209; 73/DIG. 2
(58) Field of Search ...................... 73/862.333, DIG. 2; 324/209

(56) References Cited

U.S. PATENT DOCUMENTS

| | | | |
|---|---|---|---|
| 4,106,334 A | * | 8/1978 | Studtmann ................ 73/136 A |
| 4,414,855 A | * | 11/1983 | Iwasaki .................... 73/862.36 |
| 4,887,471 A | | 12/1989 | Kolvacic et al. |
| 5,122,742 A | * | 6/1992 | Hoffmann et al. .......... 324/209 |
| 5,351,555 A | | 10/1994 | Garshelis |
| 5,465,627 A | | 11/1995 | Garshelis |
| 5,520,059 A | * | 5/1996 | Garshelis ............... 73/862.335 |
| 5,522,269 A | * | 6/1996 | Takeda et al. ......... 73/862.333 |
| 5,646,356 A | | 7/1997 | Ling et al. |
| 5,706,572 A | | 1/1998 | Garshelis |

OTHER PUBLICATIONS

Sami Bitar and John S. Probst—Development of a Magnetoelastic Torque Sensor for Formula 1 and CHAMP Car Racing Applications; 00PC–338, Copyright© 2000 Socity of Automotive Engineers, Inc.

"Development Of A Magnetoelastic Torque Transducer For Automotive Transmission Applications", by Ivan J. Garshelis, SAE Technical Paper No. 970605, Feb. 24–27, 1997, pp. 35–44.

* cited by examiner

Primary Examiner—Benjamin R. Fuller
Assistant Examiner—Lilybett Martin
(74) Attorney, Agent, or Firm—Jennifer Stec

(57) ABSTRACT

A torque sensor having an array of four saturable core magnetic flux detectors arranged in two pairs. Each pair of flux detectors is associated with a pair of magnetoelastic bands. A triangle signal is applied to one end of each pair of flux detectors and an offset correction voltage is applied to the opposite ends. Two amplifiers are associated with each pair of torque detectors and are responsive to the second harmonic of detected flux signals. The signal conditioning electronics provide automatic offset and drift correction.

12 Claims, 3 Drawing Sheets

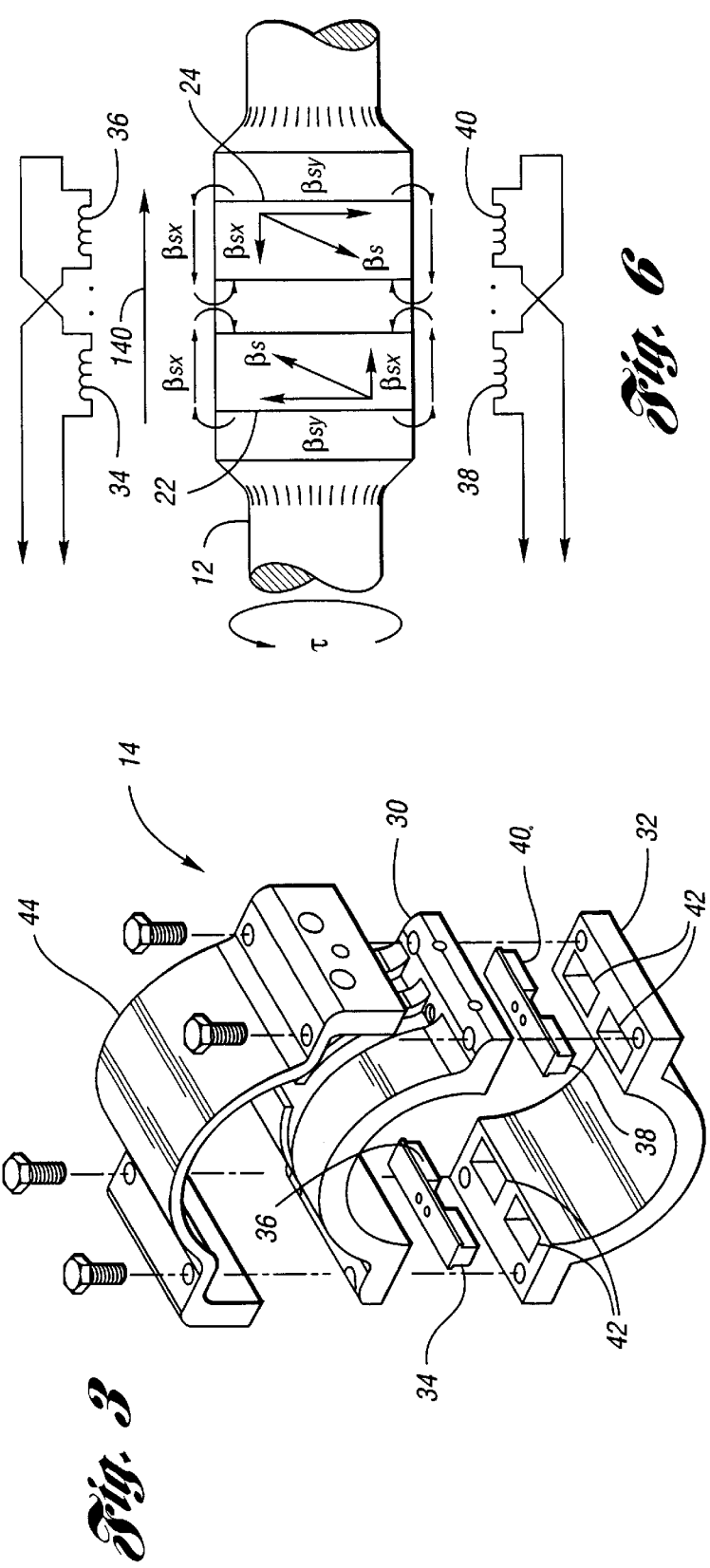

INTEGRATED TWO-CHANNEL TORQUE SENSOR

TECHNICAL FIELD

The invention is related to the field of magnetoelastic torque sensors and, in particular, to an integrated, two-channel, magnetoelastic torque sensor.

BACKGROUND ART

Measurement of torque is useful in a diverse range of automotive and industrial fields. Torque is one of the two fundamental physical quantities required to analyze rotating drive mechanisms. The other physical quantity is the speed of rotation. For example, the torque being transmitted by an automotive driveshaft can provide a wealth of information about the performance of the powertrain and the chassis of the vehicle. Torque measurements could also be valuable in quantifying and analyzing transmission efficiencies. In the analysis of existing torque sensing technologies, it has been concluded that in the automotive field a torque sensing system requiring neither components attached to nor functionally in contact with the shaft would be desirable. Magnetoelastic torque sensors appear to meet these requirements.

Magnetoelasticity is the term used to describe the interactions found in many materials between magnetic properties and elastic properties. Magnetoelastic torque sensor technology operates on the specific manifestation of magnetoelastic termed the Inverse Wiedemann Effect in which a magnetic field can be distorted to arise in the space around a torsionally stressed member. In particular, circularly polarized bands of a magnetoelastically active shaft material creates a magnetic field that in intensity and polarity is a near perfect linear analog of the torque transmitted. No excitation power other than a mechanical torque is required to create this magnetic field, and only a magnetic field detector is required to detect the magnitude and rotational direction of the applied torque.

DISCLOSURE OF INVENTION

This invention is a dual-channel magnetoelastic torque sensor having an array of saturable core magnetic flux detectors. The flux detectors detect the magnetic field generated by a pair of oppositely polarized magnetoelastic bands provided on a shaft, such as the drive shaft of an automobile vehicle. The array of saturable core magnetic flux detectors consists of two pairs of diametrically opposite flux detectors. Each pair of diametrically opposed flux detectors are serially connected to each other and have one flux detector associated with each magnetoelastic band and arranged to null out any static magnetic field such as the earth's magnetic field. A triangular wave is applied to one end of each pair of saturable core magnetic flux detectors. A triangular wave is used because it will induce a current only odd harmonic constant voltage across the array until the array current saturates the detectors. A pair of differential amplifiers connected to each pair of serially connected flux detectors outputs a signal corresponding to the second harmonic of the triangular wave resulting from energizing the pair of saturable core flux detectors. The outputs from each pair of differential amplifiers are summed to produce an amplified output signal. The output signal is fed back to an offset amplifier to correct a reference signal being applied to the opposite ends of the pair of serially connected, saturable-core, magnetic flux detectors. An electronic control controls the frequency and pulse width at which the square wave is being generated and actuates the differential amplifiers to detect the second harmonic of the resultant signal. The torque sensor further includes an integrator connected between the output of each differential amplifier back to a summing node to periodically correct the output offset voltage of the differential amplifier to a predetermined value when the input to the amplifiers are grounded. The electronic control is further responsive to a malfunction of any of differential amplifiers to disable that amplifier and permit continued operation with reduced sensitivity. The electric control also includes means for varying the pulse width of the signals actuating the differential amplifiers to detect a second harmonic to change the band width and response rate of the torque sensor.

A first object of the invention is to provide a torque sensor having individual improved accuracy and reliability of magnetic flux measurement.

Another object of the invention is to provide automatic offset correction.

Another object of the invention is to provide an electronic control using digital electronics to control and synchronize the timing signals.

Still another object of the invention is the ability to vary the response rate of the sensing current to rapid changes in the detected torques.

A final object of the invention is to detect and compensate for sensor failures.

These and other objects of the invention will become more apparent from a reading detailed description of the invention in conjunction with the drawings.

BRIEF DESCRIPTION OF DRAWINGS

FIG. 3 is an exploded view of the torque sensor housing assembly;

FIG. 4 is a flow diagram depicting the sequential functions of the torque sensor;

FIG. 6 is a schematic showing the relationship of the detector coils relative to the magnetoelastic bands.

BEST MODE FOR CARRYING OUT THE INVENTION

Figure 1:
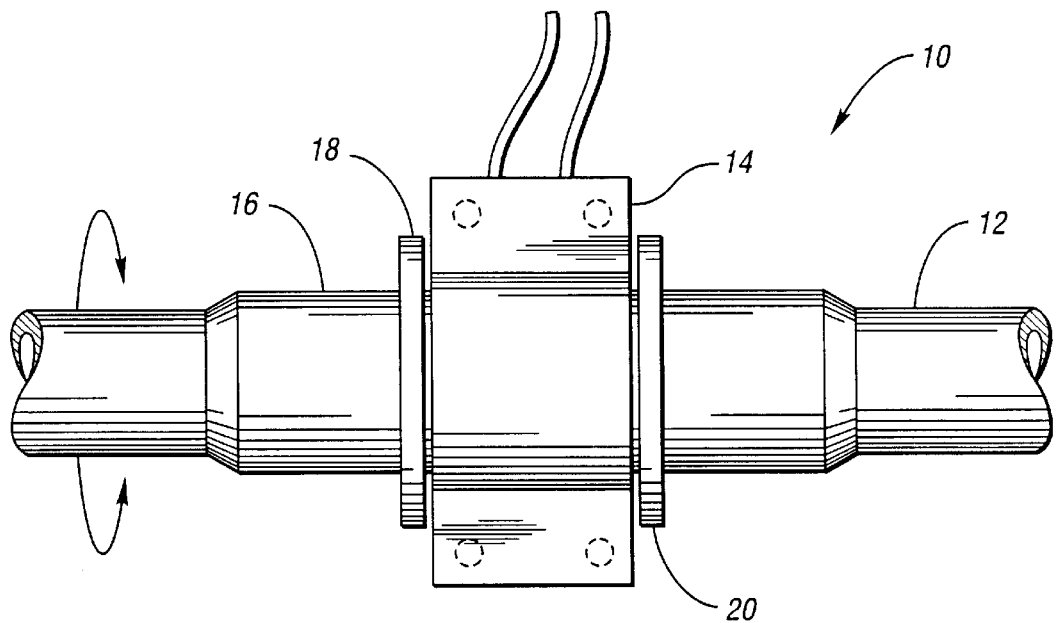
FIG. 1 is a plan view of the torque sensor and associated drive shaft.

The preferred embodiment of the two-channel magnetoelastic torque sensor 10 is shown in FIG. 1. The magnetoelastic torque sensor 10 is adapted to circumscribe a shaft 12 to which a torque is to be applied. The shaft 12 may be a drive shaft of an automotive vehicle such as a car, a truck or racing vehicle or may be the drive shaft between a source of rotary power and a driven device or machine. The drive shaft 12 in an automotive vehicle is sized to have minimum mass and adequate strength to transmit the desired torque. In particular, the drive shaft in an automotive vehicle is classified as a safety critical item and often is the single most highly stressed component of the vehicles drivetrain.

Beyond satisfying the mechanical torque transmission requirements, the drive shaft material needs to have sufficiently high magnetostriction and coercive forces and, in particular, exhibit the specific manifestation of the Inverse Wiedemann Effect. Also, due to the elevated temperatures encountered in many applications, low sensitivity of the magnetoelastic sensor to temperature is required. Preferably, the material from which the shaft 12 is made should have a Curie temperature well above 150° C. Fortunately, a number of ultra-high strength steels are available that meet these requirements. It is interesting to note that certain alloying combinations which improve the mechanical properties of these steels, such as hardenability, are believed to also increase the required magnetoelastical properties of the metal. Another physical property of the material from which the shaft is made is the stability of the transfer function with repeated cycling at high stress levels.

A magnetoelastic sensor housing assembly 14 circumscribes the drive shaft 12 about an enlarged diameter segment 16 between a pair of collars 18 and 20. The collars 18 and 20 are preferably pressed on the shaft 12 and limit the axial displacement of the magnetoelastic sensor housing 14 to less than 1.0 millimeters.

Figure 2:
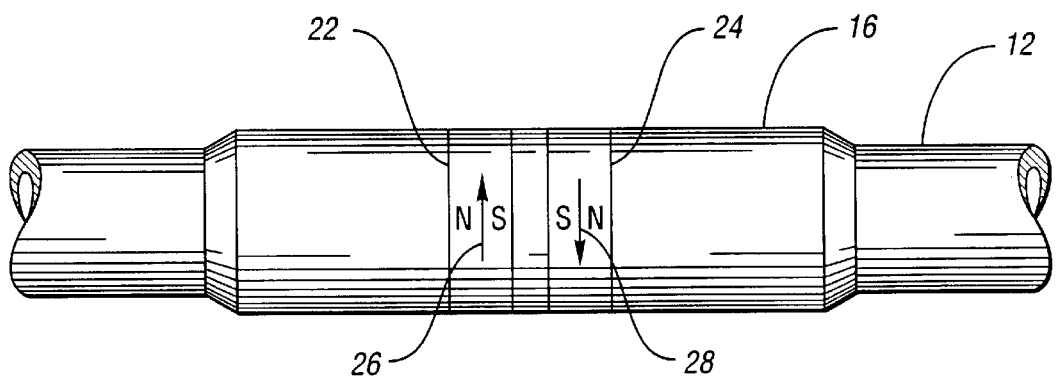
FIG. 2 is a frontal view of the drive shaft to show the magnetoelastic bands.

The drive shaft 12, as more clearly shown on FIG. 2 has a pair of magnetoelastic polarized bands 22 and 24 formed on the enlarged segment 16 between the collars 18 and 20. The magnetoelastic polarized bands 22 and 24 are polarized in opposite directions as indicated by arrows 26 and 28. The bands are individually formed by rotating the drive shafts in the presence of the fringing field of a narrow gap C-shaped electromagnet. Several steps are exercised to minimize variability such as tight dimensioning and position control and the use of a laboratory grade programmable current supply for excitation of the C-shaped electromagnets.

The details of the magnetoelectric sensor housing assembly 14 are shown on FIG. 3. The housing assembly 14 consists of an upper housing 30 and a lower housing 32 both made from a high temperature electrical insulating material such as a polyimide. In the best mode, the polyimide is a product of the Dupont Company of Wilmington, Del., and sold under the trade name of Vespel®. Vespel® was found to have excellent structural and dimensional stability at high temperatures, is electrically insulating and has self-lubricating properties. Tightly controlled tolerances on the inner diameter formed by the upper housing 30 and lower housing 32 minimize the transverse displacement of the housing assembly relative to the polarized bands 22 and 24. Four saturable core magnetic flux detectors 34–40 are received in pockets 42 provided in the upper and lower housings, respectively. These magnetic flux detectors 34–40 each consist of small diameter solenoid winding or coil encircling a single strand of amorphous metal fiber which forms the core. The pockets 42 align the magnetic flux detectors 34–40 with the two polarized bands 22 and 24 in diametrically opposite pairs, one pair for each polarized band. The diametrically opposed pair of magnetic flux detectors 34–40 avoid potential problems from ambient magnetic field gradients and signal inhomogeneties in the circular magnetization of the polarized bands. Two magnetic flux detectors 34–40, one associated with each of the two polarized bands 22 and 24, respectively, are mounted on printed circuit boards. An aluminum protective cover 44 is provided to cover the upper housing 30 and four non-magnetic fasteners are used to secure the upper housing 30, lower housing 32 and protective cover 44 to each other. The protective cover 44 protects the wires and saturable core detectors from damage, provides a strain relief facility for the wire and provides attachment parts by means of which the sensor housing assembly 14 can be attached to a fixed member such as the chassis of an automotive vehicle. Preferably, the housing assembly is mounted to the non-sprung end of the drive shaft to minimize relative axial movement between the drive shaft and the housing assembly.

FIG. 4 illustrates the relationship between the elements of the integrated, two-channel magnetoelastic torque sensor. An applied torque arrow 50 is imparted to the drive shaft 12 of the magnetoelastic sensor, block 52. The magnetoelastic bands in response to an applied torque generate magnetic fields, arrow 54, which are detected by the array of magnetoelastic flux detectors 34–40, block 56. The array of detectors 34–40 generate electrical voltage signals which are transmitted, arrow 58, to signal conditioning electronics, block 60. The signal conditioning electronics generates an output electrical signal indicative of the applied torque, arrow 62.

Figure 5:
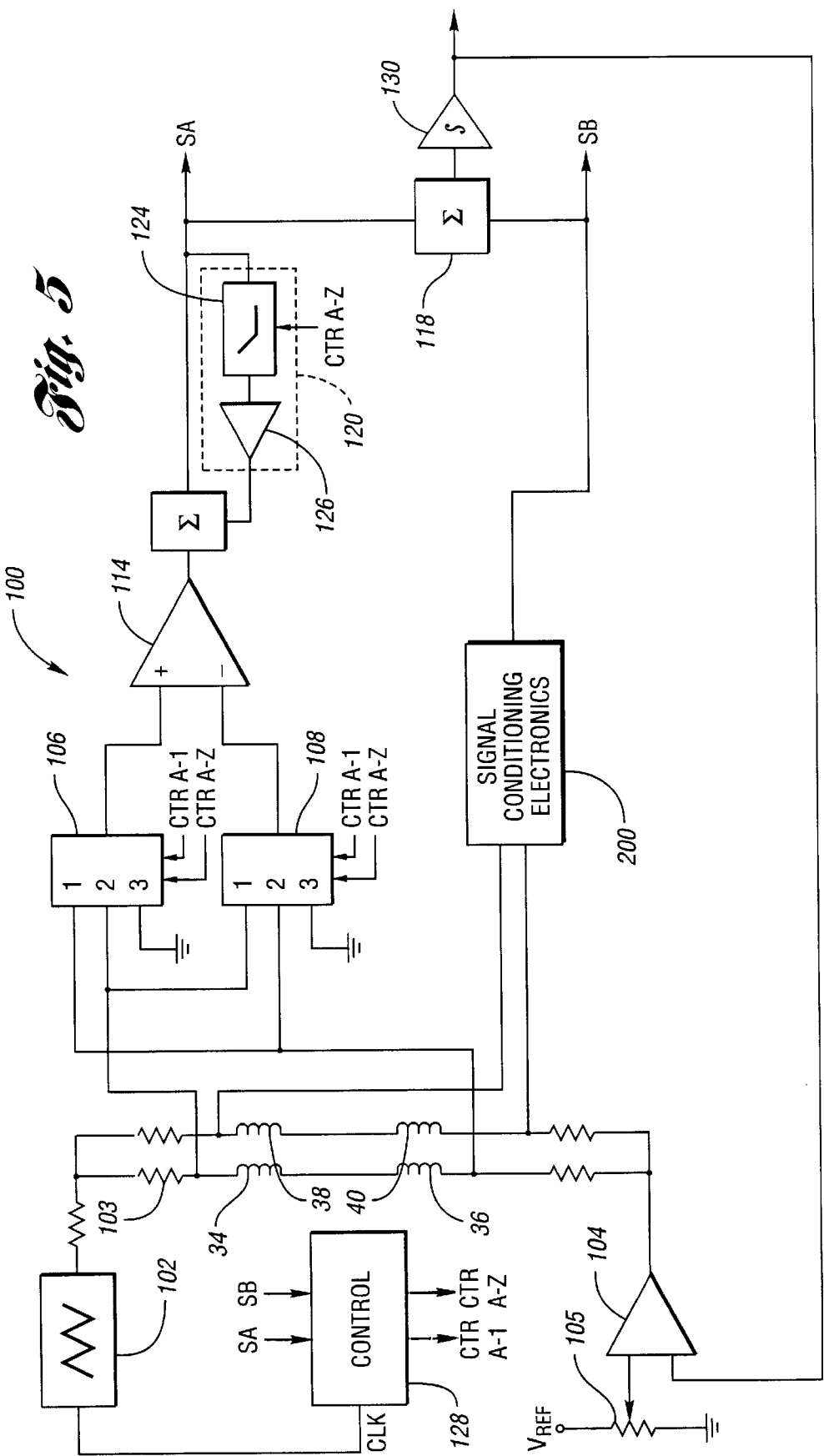
FIG. 5 is a circuit diagram of the signal conditioning circuit.

FIG. 5 is a circuit diagram of the signal conditioning electronics 100. To simplify the description, the circuit shown on FIG. 5 is for only one pair of flux detectors such as detector coils 34 and 36 associated with magnetoelastic bands 22 and 24, respectively. The coils 34 and 36 are connected in opposing series as shown in FIG. 6 such that the effects of a static magnetic field, such as the earth's magnetic field indicated by arrow 140, produce equal and opposite signals which effectively cancel each other out. A first end of the serially connected coils 34 and 36 is connected to a triangular wave generator 102 through resistance 103. Resistance 103 converts the triangular output voltage to a triangular current through the series connected detectors 34 and 36. The triangular wave generated by the triangular wave generator 102 has a peak-to-peak voltage ranging, in the preferred embodiment, from 4 volts maximum to 1.0 volt minimum of the same polarity but other maximum and minimum values may be selected.

The first end of the serially connected detector coils 34 and 36 is connected to the first input to multiplexer 106 and to the second input of multiplexer 108. The opposite end of the serially connected detector coils is connected to the second input of multiplexer 106 and to the first input to multiplexer 108. The third input to multiplexers 106 and 108 are connected to a common potential such as ground. The multiplexers 106 and 108 act as flux gates controlling the inputs to differential instrumentation amplifier 114.

The outputs of multiplexer 106 and 108 are connected to the positive and negative inputs, respectively, of differential instrumentation amplifier 114.

The signal conditioning electronics 200 for the detectors 38 and 40 are identical to the signal conditioning circuit 100 discussed above and need not be repeated for an understanding of the invention.

The outputs of the first and second signal conditioning circuits 100 and 200 are connected to a sum amplifier 118 which sums the output of the two signal conditioning electronics to produce an output signal. The output signal is integrated and the integrated signal is fed back to one input of an offset correction amplifier 104 to adjust the value of the offset voltage applied to the opposite end of the serially connected coils 34 and 36. The other input to the offset correction amplifier is connected to a voltage divider 105 connected between a reference voltage and ground. The output of the offset correction amplifier is intermediate the maximum and minimum potential of the triangular wave.

A drift correction circuit 120 is an integrator comprising a switch 124 and a feedback amplifier 126 connected between output of the differential amplifier 114 and output adjustment input to that differential amplifier.

The triangular wave generator 102 multiplexers 106 and 108 and switch 124 are activated in response to outputs of a programmed electronic control 128. The electronic control 128 generates a clock (CLK) signal which controls the frequency of the triangular wave generator 102 and the control (CTR) signals which control the operation of the multiplexers 106 and 108. The control signal CTR switches the outputs of the multiplexers 106 and 108 between the first and second inputs at a frequency corresponding to the second harmonic of the frequency of the triangular wave such that the inputs to differential amplifiers 114 and the corresponding amplifier in the signed conditioning electronics 200 are reversed at least twice during each cycle of the triangular wave. The control 128 will also periodically generate a drift correction signal to the multiplexers 106 and 108 and the switch 124. The drift correction signal will activate the control signal to the multiplexers 106 and 108 to switch to the third or grounded inputs applying a ground signals to both inputs of the differential amplifier 114. With both inputs grounded, the output of differential amplifier should be zero. The drift correction signal will also activate the switch 124 in the drift correction circuits 120. The closing of the switch provides a negative feedback to the output adjustment inputs of the differential amplifiers proportional to the offset of the amplifier 114 to correct its output to zero when its inputs are grounded.

The second harmonic signal component of the sensor arrays are summed together in sum amplifier 118 then integrated in integrator circuit 130. The output of integrator circuit 130 accumulates over time the total second harmonic signal component present at the detectors. The output of the integrator 130 is fed back into offset correction amplifier 104 until an offset magnetic field, equal and opposite to the shaft's dynamic magnetic field, is created. At such time, with the dynamic magnetic field effectively canceled by the magnetic field induced by the offset correction amplifier 104. The second harmonic signal component present in the detector amplifier 114 dissipates to zero and the integrator circuit 130 stops accumulating. The output of the integrator circuit 130 becomes a measurement of the shaft's dynamic magnetic field induced by torque on the shaft and the inverse Wiedermann effect.

The output of the differential amplifier 114, labeled SA, is also applied to the control 128 to detect a malfunction. The output SA is compared in the electronic control 128 to fixed limit values. When the output of differential amplifier exceeds the limit value, the control 128 will generate a signal to the associated multiplexer which places the inputs at ground deactivating that differential amplifier. This results in continued operation of the sensor but with degraded performances in the response time and in the averaging of the magnetic field on both sides of the drive shaft.

The electronic control 128 also permits the duty cycle of the control signals to be changed. The duty cycle of the control signals activating the multiplexers control the proportion of the detector signal that reaches the final detector portion of the conditioning electronic 100. By reducing the pulse width or the duty cycle of the control signals, the amount of the signal available for detection is summarily reduced. The net result is a reduction in the band width response of the sensor to rapid changes in torque. This allows conditioning electronic circuit to be set for high frequency response to rapid torque changes which might be seen in drivetrain oscillations or for slower response rate where the oscillations would be averaged together. This results in only increasing the response time but not the overall gain of the circuit because the overall gain of the system is only in response to the gain of amplifier 104.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A dual channel magnetoelastic torque sensor comprising:

a shaft adapted to receive a torque;

a pair of oppositely polarized magnetoelastic bands provided on the shaft, the pair of magnetoelastic bands producing a magnetic field in response to a torque being applied to the shaft;

a high temperature plastic housing circumscribing the shaft having a plurality of pockets and overlaying the pair of magnetoelastic bands;

at least a first pair of serially connected magnetic flux detectors comprised of small diameter solenoid coils disposed inside of said pockets, each magnetic flux detector being adjacent to a respective one of the pair of magnetoelastic bands and responsive to the magnetic field generated by the magnetoelastic bands to produce a signal; the magnetic flux detectors being arranged such that a signal induced in one of the magnetic flux detectors by a static magnetic field is of equal and opposite polarity to the signal induced in the second magnetic flux detector;

a triangular wave generator connected to a first end of the at least first pair of serially connected magnetic flux detectors; the triangular wave generated by the triangular wave generator having a predetermined maximum and a predetermined minimum voltage value;

an amplifier having at least two inputs and an output;

a first multiplexer means connected between the pair of magnetoelastic flux detectors and the amplifiers for alternately switching the two inputs of the amplifier between connections to opposite ends of the pair of serially connected magnetic flux detectors at a frequency corresponding to the second harmonic of the triangular wave;

an integrator circuit connected to the output of the amplifier, the integrator circuit integrating the output of the amplifier to generate a signal indicative of the torque applied to that shaft;

an offset correction generator connected to the opposite end of the serially connected magnetic flux detectors, the offset correction generator generating an offset signal in response to the output of the integrator circuit, the offset signal equalizing the output second harmonic signals produced by the amplifier; and an electronic control connected to the triangle wave generator and the multiplex means, the electronic control generating a first signal controlling the frequency of the triangular wave generated by the triangular wave generator and generating a second signal synchronized with the first signal, the second signal activating the multiplexer means to switch the connections of the inputs to the amplifier to the opposite ends of the pairs of serially connected flux detectors at a frequency corresponding to the second harmonic of the triangular wave.

2. The torque sensor of claim 1 wherein the shaft is made from a magnetoelastic material and the pair of oppositely polarized magnetoelastic bands are formed in the shaft.

3. The torque sensor of claim 1 wherein the at least one pair of magnetic flux detectors is a pair of saturable core magnetic flux detectors having a small diameter solenoidal winding wound around a single strand of amorphous material.

4. The torque sensor of claim 1 wherein said multiplexer means includes means for switching both inputs to the amplifier to a predetermined potential and wherein the amplifier has a summing node; the torque sensor further comprising:

an integrator associated with the amplifier the integrator responsive to the signal output from the amplifier for periodically generating an output correction signal applied to the summing node of the respective amplifier to produce a predetermined output when the inputs to the respective amplifier are at the predetermined potential; and wherein the electronic control further periodically generates a drift correction signal activating the multiplexer means to connect the predetermined potential to both inputs of the amplifier and for actuating the integrator to apply the output correction signal to the summing node of the amplifier to produce a desired output.

5. The torque sensor of claim 4 wherein the predetermined potential is a ground potential.

6. The torque sensor of claim 4 wherein the amplifier is a differential amplifier.

7. The torque sensor of claim 3 wherein the multiplexer means comprises:

at least one pair of multiplexers associated with the amplifier, each multiplexer of the pair of multiplexer having at least a first input connected to one end of the pair of serially connected flux detectors; at least a second input connected to the other end of the serially connected flux detectors; the output of the first multiplexer of each pair of multiplexer connected to one input of the amplifier and the output of the second multiplexer being connected to the second input of the amplifier.

8. The torque sensor of claim 1 wherein the offset correction generator comprises:

a differential amplifier having a first input receiving a reference potential; a second input receiving the output of the integrator circuit; and an output connected to the opposite end of said pair of serially connected flux detectors.

9. The torque sensor of claim 1 wherein the predetermined maximum voltage value of the triangular wave is approximately 4.0 volts and the minimum value is approximately 1.0 volts.

10. The torque sensor of claim 1 further comprising:

a second pair of serially connected saturable core magnetic flux detectors disposed in the housing, each flux detector of the second pair of flux detectors being associated with a respective one of the pair of magnetoelastic bands and disposed diametrically opposite of the corresponding flux detector of the first pair of flux detectors, the second pair of magnetic flux detectors also being responsive to the magnetic field generated by the magnetoelastic bands to produce a signal in response to a torque applied to the shaft;

a second amplifiers having at least two inputs and an output;

a second multiplexer means connected between the ends of the serially connected magnetic flux detectors and the second amplifier, the second multiplexer means activated by the second signals generated by the electronic control alternately switching the at least two inputs to the second amplifier between connections to opposite ends of the second pair of serially connected flux detectors;

a sum amplifier connected to the outputs of the first and second amplifiers, the sum amplifier summing the outputs of the first and second amplifiers to provide a summed output signal; and wherein the integrator circuit is connected to the output of the sum amplifier and is responsive to the summed output signal to generate a signal having a value corresponding to the torque applied to the shaft.

11. The torque sensors of claim 10 wherein the electronic control further includes means responsive to the malfunction of any amplifier of the first and second amplifiers to disable the malfunctioning amplifier.

12. The torque sensor of claim 10 wherein the control includes means to reduce the pulse with a second signal controlling the multiplexer to control the band width response of the torque sensors.

* * * * *